US009853801B2

(12) United States Patent
Sjoland et al.

(10) Patent No.: US 9,853,801 B2
(45) Date of Patent: Dec. 26, 2017

(54) TRANSCEIVER ARRANGEMENT, COMMUNICATION DEVICE, AND METHOD

(71) Applicant: Telefonaktiebolaget LM Ericsson (publ), Stockholm (SE)

(72) Inventors: Henrik Sjoland, Lund (SE); Johan Wernehag, Malmo (SE); Stefan Andersson, Flyinge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 81 days.

(21) Appl. No.: 15/026,671

(22) PCT Filed: Oct. 4, 2013

(86) PCT No.: PCT/EP2013/070715
§ 371 (c)(1),
(2) Date: Apr. 1, 2016

(87) PCT Pub. No.: WO2015/049012
PCT Pub. Date: Apr. 9, 2015

(65) Prior Publication Data
US 2016/0254898 A1 Sep. 1, 2016

(51) Int. Cl.
*H04L 5/14* (2006.01)
*H04L 12/935* (2013.01)
(Continued)

(52) U.S. Cl.
CPC ............ *H04L 5/14* (2013.01); *H04B 1/0458* (2013.01); *H04B 1/18* (2013.01); *H04B 1/525* (2013.01);
(Continued)

(58) Field of Classification Search
CPC ... H04L 5/14; H04L 49/30; H04L 2012/5614; H04B 1/525; H04B 1/0458; H04B 1/18; H04Q 11/0471
See application file for complete search history.

(56) References Cited

U.S. PATENT DOCUMENTS

2002/0118732 A1* 8/2002 Koren .................... H04B 1/581
375/219
2005/0053227 A1* 3/2005 Fortier .................... H04B 3/30
379/390.04
(Continued)

FOREIGN PATENT DOCUMENTS

EP      2621097 A1    7/2013
WO  2009080878 A1    7/2009

OTHER PUBLICATIONS

PCT International Search Report, dated Mar. 17, 2014, in connection with International Application No. PCT/EP2013/070715, all pages.
(Continued)

*Primary Examiner* — Warner Wong
(74) *Attorney, Agent, or Firm* — Leffler Intellectual Property Law, PLLC

(57) ABSTRACT

A transceiver arrangement comprising a receiver and a transmitter arranged for frequency-division duplex communication with a communication network, a transmission port for connecting to an antenna, a balancing impedance circuit arranged to provide an adaptive impedance arranged to mimic the impedance at the transmission port, a filtering arrangement connecting the receiver, transmitter, transmission port and balancing impedance circuit, and a common-mode signal reduction circuit is disclosed. The filter arrangement comprises filters of a first type arranged to pass signals at transmitter frequency and attenuate signals at receiver frequency and are connected between the transmitter and the
(Continued)

transmission port and between the receiver and the balancing impedance circuit, and filters of a second type arranged to attenuate signals at transmitter frequency and pass signals at receiver frequency and are connected between the transmitter and the balancing impedance circuit and between the receiver and the transmission port. The common-mode signal reduction circuit comprises an inverting amplifier, the input of the inverting amplifier is provided by a voltage division between a first and a second impedance where the first and second impedance have equal impedances, and the output of the amplifier is provided to junction of a third and a fourth impedance where the third and fourth impedances have equal impedances, and the first and second impedances, and the third and fourth impedances, respectively, are connected in series between a filter of the first type and a filter of the second type. A communication device and method are also disclosed.

15 Claims, 5 Drawing Sheets

(51) Int. Cl.
*H04Q 11/04* (2006.01)
*H04B 1/04* (2006.01)
*H04B 1/18* (2006.01)
*H04B 1/525* (2015.01)

(52) U.S. Cl.
CPC .......... *H04L 49/30* (2013.01); *H04Q 11/0471* (2013.01)

(56) References Cited

U.S. PATENT DOCUMENTS

| | | | |
|---|---|---|---|
| 2007/0177679 A1* | 8/2007 | Sovenyi | H04L 12/407 375/257 |
| 2008/0198772 A1 | 8/2008 | Loh | |
| 2008/0267301 A1* | 10/2008 | Alfano | H01L 23/48 375/258 |
| 2011/0064004 A1 | 3/2011 | Mikhemar et al. | |
| 2011/0299433 A1 | 12/2011 | Darabi et al. | |
| 2016/0352496 A1* | 12/2016 | Sjoland | H04B 1/18 |

OTHER PUBLICATIONS

PCT Written Opinion, dated Mar. 17, 2014, in connection with International Application No. PCT/EP2013/070715, all pages.

* cited by examiner

TRANSCEIVER ARRANGEMENT, COMMUNICATION DEVICE, AND METHOD

TECHNICAL FIELD

The present invention generally relates to a transceiver. The present invention also relates to a communication device capable of frequency division duplex communication comprising such a transceiver. The present invention also relates to a method of operating such a transceiver.

BACKGROUND

Transceivers comprise both a transmitter and a receiver, and are commonly used in a variety of communication apparatuses. Transceivers can be arranged to be operated in semi-duplex, i.e. the receiver and transmitter operate separated in time to prevent the transmitter signal from concealing the received signal. This approach is therefore commonly referred to as time division duplex (TDD). Transceivers can also be operated in full duplex, i.e. the receiver and transmitter operate simultaneously wherein some special arrangements are provided to prevent the transmitter from concealing the received signal. One approach to achieve this is to assign different frequencies for transmission and reception. This approach is therefore commonly referred to as frequency division duplex (FDD).

Often the receiver and the transmitter use the same antenna, or antenna system which may comprise several antennas, which implies that some kind of circuitry may be desired to enable proper interaction with the antenna. This circuitry should be made with certain care when operating the transceiver in full duplex since the transmitter signal, although using FDD, may interfere with the received signal, i.e. internal interference within the transceiver. FIG. 1 illustrates an example of a communication apparatus 100 comprising a transceiver 102, an antenna 104 connected to the transceiver 102, and further circuitry 106 such as processing means, input and output circuitry, and memory means. The transceiver 102 comprises a transmitter 108, a receiver 110, and a duplexer 112 which is connected to the transmitter 102, the receiver 110 and the antenna 104. The duplexer 112 is arranged to direct radio frequency (RF) signal from the transmitter to the antenna, as indicated by arrow 114, and from the antenna to the receiver, as indicated by arrow 116, and can for example comprise a circulator. Duplexers are known in the art and for example described in U.S. Pat. No. 4,325,140. However, duplexers are not ideal and a leakage of transmitter signals from the transmitter to the receiver, as indicated by arrow 118, is at least to some degree present. Further, duplexers are commonly costly, space consuming and challenging to be implemented on-chip. Therefore, efforts have been made in the art to achieve the similar effects with on-chip solutions. These are based on electrical balance by using a dummy load which is arranged to be equal to the antenna impedance. FIG. 2 illustrates an example of such a structure 200, which is also disclosed in WO 2009/080878 A1, comprising a transmitter 202, a receiver 204, and an antenna 206. The transmitter 202 provides its output signal both to a branch towards the antenna 206, the branch comprising a capacitor 208 and an inductor 210, and to a branch towards a dummy load 212, the branch comprising a capacitor 208' and an inductor 210'. The dummy load 212 is arranged to mimic the impedance of the antenna 206, and by the achieved symmetry, and, when using a differential input to the receiver 204 via a transformer 214, the contribution at the receiver input from the transmitted signal can be suppressed. A drawback of this solution is that half the signal energy is lost in the dummy load 212. Another drawback is that a transformer is necessary, which may be hard to implement at low cost and/or low space consumption, e.g. on chip.

SUMMARY

An object of the invention is to at least alleviate the above stated problem. The present invention is based on the understanding that counteracting contribution from a transmitter at a receiver input in a transceiver reduces or cancels the signal. The inventors have found that contribution by the transmitter signal at the receiver input can be further alleviated by a filtering structure, wherein also less transmitter energy is lost in the dummy load. In a similar way, less received signal is lost in the dummy load. In addition to this, by using an amplifier arrangement to suppress a common-mode signal, no transformer is needed.

According to a first aspect, there is provided a transceiver arrangement comprising a receiver arranged for frequency-division duplex communication with a communication network, a transmitter arranged for frequency-division duplex communication with the communication network, a transmission port for connecting to an antenna, a balancing impedance circuit arranged to provide an adaptive impedance arranged to mimic the impedance at the transmission port, a filtering arrangement, which comprises filters of a first type and filters of a second type, connecting the receiver, transmitter, transmission port and balancing impedance circuit, and a common-mode signal reduction circuit. The filters of the first type are arranged to pass signals at transmitter frequency and attenuate signals at receiver frequency and are connected between the transmitter and the transmission port and between the receiver and the balancing impedance circuit. The filters of the second type are arranged to attenuate signals at transmitter frequency and pass signals at receiver frequency and are connected between the transmitter and the balancing impedance circuit and between the receiver and the transmission port. The common-mode signal reduction circuit comprises an inverting amplifier, the input of the inverting amplifier is provided by a voltage division between a first and a second impedance where the first and second impedance have equal impedances, and the output of the amplifier is provided to junction of a third and a fourth impedance where the third and fourth impedances have equal impedances, and the first and second impedances, and the third and fourth impedances, respectively, are connected in series between a filter of the first type and a filter of the second type.

The receiver may have a differential input and the common-mode signal reduction circuit may be arranged such that the first and second impedances, and the third and fourth impedances, respectively, are connected in series between the inputs of the differential input of the receiver. The transceiver arrangement may comprise a fifth and a sixth impedance arranged between the transmitter and a filter of the first type and a filter of the second type, respectively, and the fifth and sixth impedances may have equal impedances as the impedances terminating common-mode signals at the receiver input. In this context, "equal" should be construed in light of inherent tolerances in a practical implementation.

The common-mode signal reduction circuit may be arranged such that the third and fourth impedances form the balancing impedance circuit.

The first and second impedances may be capacitors.

The filters of the first and second types may be non-directional filters comprising linear components.

The inverting amplifier may have a voltage gain above 5, preferably above 10.

The transceiver arrangement may further comprise an amplitude detector arrangement at a terminal or terminals of an input port of the receiver, wherein the transceiver arrangement may comprise a controller arranged to control the adaptive impedance of the balancing impedance circuit such that the amplitude at the terminal or terminals of an input port of the receiver is reduced based on measurements by the amplitude detector arrangement.

The filters of the first type may each comprise a capacitance and a first inductance coupled in parallel where the parallel coupling is coupled in series with a second inductance, and the filters of the second type may each comprise a first capacitance and an inductance coupled in parallel, where the parallel coupling is coupled in series with a second capacitance. At least one of the capacitance and the first and second inductances of each of the filters of the first type may be controllable and are controlled by a controller, and at least one of the inductance and the first and second capacitances of each of the filters of the second type may be controllable and are controlled by the controller.

The filters of the first type may each comprise a first capacitance and an inductance coupled in parallel, where the parallel coupling is coupled in series with a second capacitance, and the filters of the second type may each comprise a capacitance and a first inductance coupled in parallel where the parallel coupling is coupled in series with a second inductance. At least one of the inductance and the first and second capacitances of each of the filters of the first type may be controllable and are controlled by a controller, and at least one of the capacitance and the first and second inductances of each of the filters of the second type may be controllable and are controlled by the controller.

According to a second aspect, there is provided a communication device, capable of frequency division duplex communication via a communication network, comprising a transceiver arrangement according to the first aspect.

According to a third aspect, there is provided a method of controlling a transceiver arrangement according to the first aspect. The method comprises measuring amplitude at terminals of an input port of the receiver; and adjusting the adaptive impedance of the balancing impedance such that the amplitude is reduced.

The method may further comprise controlling pass and stop frequencies of the filters of the first and second types, respectively, based on receive and transmit frequencies of current operation of the transceiver arrangement.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
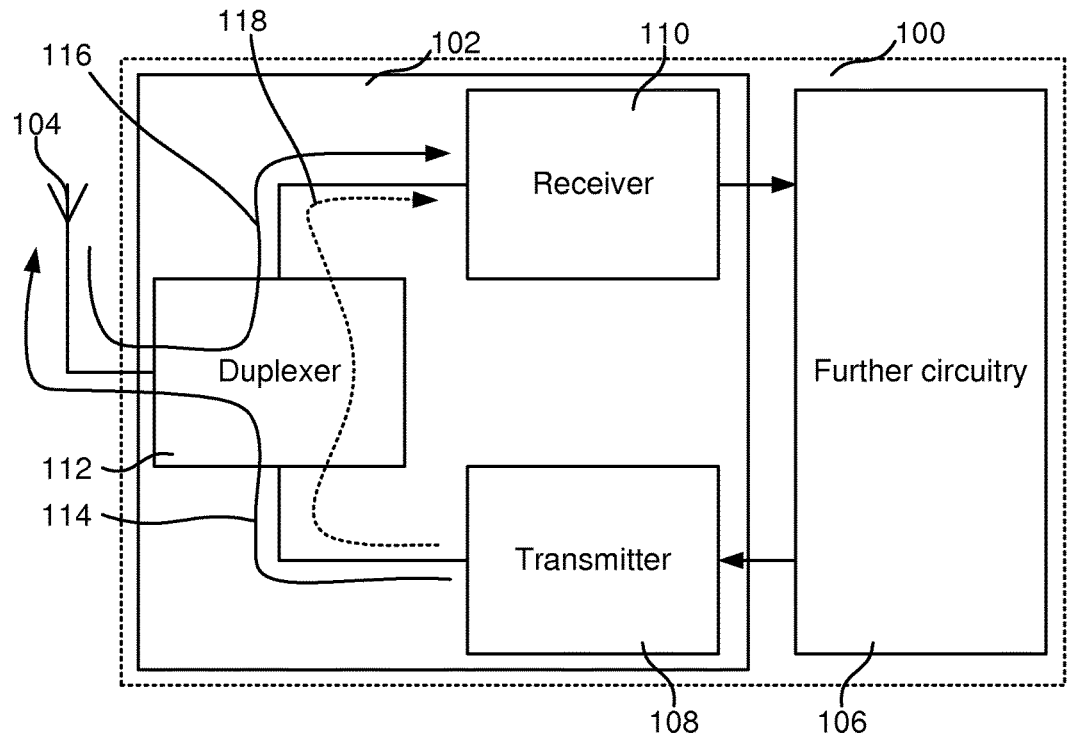
FIG. 1 is a block diagram which schematically illustrates a conventional communication apparatus comprising a transceiver.
Figure 2:
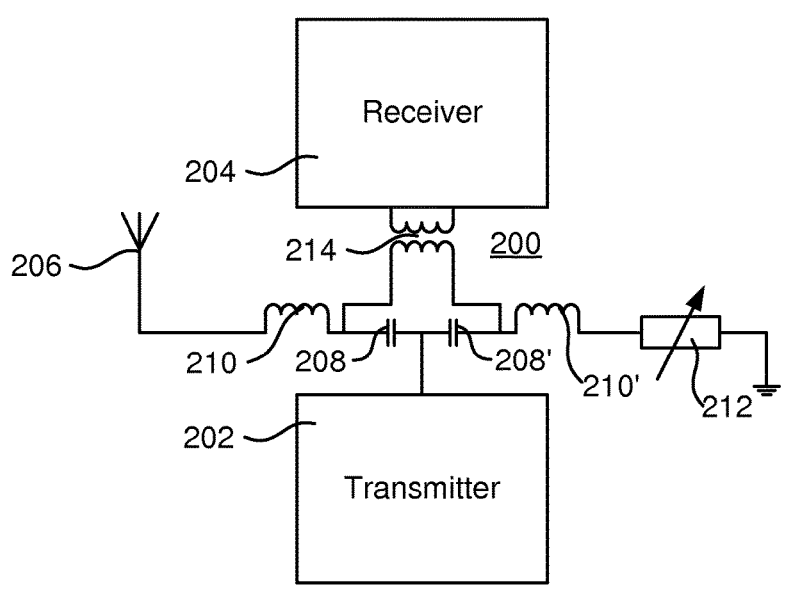
FIG. 2 is a schematic circuit diagram which illustrates an FDD transceiver arrangement with a duplexer based on electrical balance.
Figure 3:
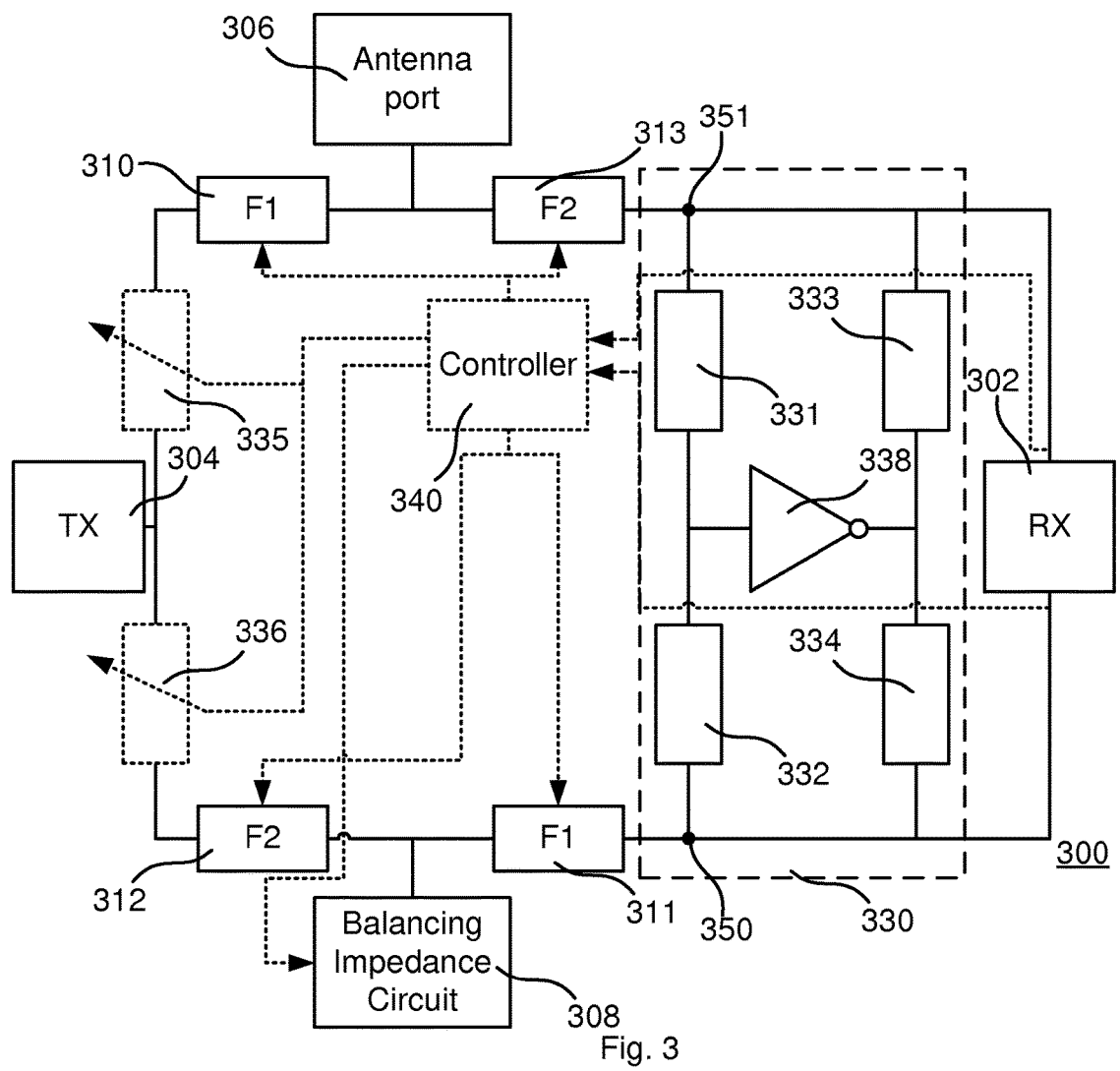
FIG. 3 is a block diagram which schematically illustrates a transceiver according to an embodiment.

FIG. 3 is a block diagram which schematically illustrates a transceiver arrangement 300 according to an embodiment. The transceiver comprises a receiver 302 arranged for frequency-division duplex communication with a wireless or wired communication network, a transmitter 304 arranged for frequency-division duplex, FDD, communication with the wireless or wired communication network, an antenna port 306 for connecting to an antenna, and a balancing impedance circuit 308 arranged to provide an adaptive impedance arranged to mimic the impedance at the antenna port 306. The balancing impedance circuit 308 can also be referred to as a dummy load mimicking the load presented by the antenna connected to the antenna port 306 at operation. Herein, the term "antenna port" is used for easier understanding and is evident for the example of a wireless transceiver. The term can be substituted by for example the term "cable connection" to provide easier understanding of how the transceivers disclosed herein can be used for wired operation in all the herein given examples. A general term can be "transmission port", which should apply for both wired and wireless operation.

The receiver 302 of the transceiver arrangement 300 works differentially and should not respond to common-mode signals; that is, when identical signals are received at the two inputs of the receiver 302, ideally no output signal is produced. This provides for cancelling of transmitter signal contribution at receiver input when balancing impedance circuit 308 is perfectly mimicking the impedance at the antenna port 306, as the transmitter signal then will be in common-mode at the receiver. Considering that an absolutely perfect mimic of impedance may not be present at all times, the transmitter signal contribution at receiver input is further reduced. This is accomplished by filters 310, 311, 312, 313 that are symmetrically arranged and symmetrically valued with respect to the two paths from transmitter to receiver. They are however not symmetrical in sense of passing signals from the transmitter towards the antenna port and balancing impedance circuit and passing signals from the antenna port and the balancing impedance circuit towards the receiver, as will be elucidated below.

Filters 310, 311 are of a first type which are arranged to pass signals at transmitting frequency, i.e. the frequency at which the transmitter 304 transmits, and are arranged to attenuate signals at receiving frequency, i.e. the frequency at which the receiver 302 receives desired signals. The transmitting frequency and the receiving frequencies are distinguished since the transceiver 300 is arranged to work with FDD communication.

Filters 312, 313 are of a second type which are arranged to pass signals at the receiving frequency and attenuate signals at the transmitting frequency. Thus, a signal at transmitting frequency from the transmitter 304 is passed via the filter 310 towards the antenna port 306 such that it is enabled to be transmitted efficiently through an antenna connected to the antenna port 306. Filter 310 also suppresses transmitter noise at the receive frequency, reducing the interference passed by filter 313 to the receiver input. The transmit signal is attenuated by the filter 313 to reduce interference at the input of the receiver 302. The transmit signal is attenuated by the filter 312 such that only very little transmit energy is wasted in the balancing impedance circuit 308, and reduces transmit energy that reach the receiver 302 via the path over the filter 311, which reduces interference. It will be further elucidated below how to handle the remainder of the transmit signal that goes that way. Filter 311 suppresses transmitter noise at the receive frequency, which reduces interference at the receiver input.

A received signal from an antenna connected to the antenna port 306 reaches the receiver 302 via the filter 313 which passes the receiving signal but attenuates the transmit signal which also is present at the antenna port. Input of the receiver 302 is also connected to the balancing impedance circuit 308 via the filter 311, but the filter 311 attenuates the receiving signal wherein very little of the noise generated by the balancing impedance circuit 308 will reach the receiver 302, and very little signal energy of the received signal is wasted in the balancing impedance circuit 308. The received signal will be present not only at the input node 351, but also at the input node 350 of the receiver due to a common-mode signal reduction circuit 330, which is to be described below.

Thus, the transceiver 300 provides a structure which efficiently provides signals from the transmitter to the antenna port, efficiently provides signals from the antenna port to the receiver, and at the same time reduces interfering signals from the transmitter reaching the receiver.

Symmetry is desired to keep the aggregate contribution by the transmitter signal at the receiver input close to zero, i.e. cancellation will then occur through the symmetrical paths of the filter 310, the antenna port 306 and the filter 313 to one of the differential input terminals of the receiver 302, and of the filter 312, the balancing impedance circuit 308 and the filter 311 to the other one of the differential input terminals of the receiver 302. This is accomplished by using the same type of filters in the paths, and by adapting the impedance of the balancing impedance circuit 308 to mimic the impedance at the antenna port 306. This can be made by having a controller 340 controlling an adaptive impedance of the balancing impedance circuit 308. Here, although the controller 340 is depicted as a separate element, it can be integrated with the balancing impedance circuit 308.

The controller 340 can comprise circuitry measuring transmitter contribution signal at the input of the receiver 302, as indicated by hashed lines, and provide control to the balancing impedance circuit 308 using a control scheme where the differential transmitter signal contribution at the receiver input is minimised at all times. For example, an amplitude detector arrangement comprising one or more amplitude detectors can be arranged at a terminal or terminals of an input port or output port of the receiver to measure amplitude. The amplitude is preferably measured at receive and/or transmit frequencies. The controller 340 can thus be provided with input data about signals to enable it to control the adaptive impedance of the balancing impedance circuit 308 such that the differential signal amplitude at terminals of the input port of the receiver 302 is minimised based on measurements of the amplitude detector arrangement. The principle employed is that when this amplitude is as small as possible, the transmitter contribution at receiver input is also as small as possible for any reasonable settings of the filters.

The controller 340 can also be arranged to control the filters 310, 311, 312, 313 such that suitable filter characteristics for passing and attenuating signals as described above are achieved for different constellations of frequencies for transmitting and receiving. For example, if the transceiver operates in FDD where transmit frequency is a certain amount higher than the receive frequency, and the transceiver switches to an operation mode where the transceiver operates in FDD and where the receive frequency is a certain amount higher than the transmit frequency, the controller 340 can swap the properties of filter types F1 and F2. Similar change of respective properties of filters of types F1 and F2 can be made by the controller 340 upon change of the certain amount of frequency difference between receive and transmit frequencies, etc. As noted, signals to and from the controller are indicated as dotted arrows which indicate measurements provided to the controller 340 and control signals provided from the controller 340.

To achieve cancellation of transmitter signals at the differential receiver input port, the signal transfer is preferably equal in the two paths from the transmitter 304 to the receiver 302. The signal from the transmitter will then appear completely in common-mode at the receiver input port. For this to occur, the filters need to be terminated by the same impedances, despite their orders being mutually reversed in the two paths. The transmitter will drive the two filters 310 and 312 with the same voltage, corresponding to zero impedance between them. By terminating the filters 311 and 313 by a zero common-mode impedance at nodes 350, 351, symmetry is ensured so that the transmitter leakage to the receiver 302 will appear as common-mode. The zero common-mode impedance, i.e. short circuit, will prevent any voltage due to transmitter interference from building up at the receiver input, which will simplify the design of the receiver, which does not need to handle strong common-mode signals and provide large common-mode rejection. Rejecting the common-mode will still allow signals to pass from the antenna port 306 to the receiver 302 as these enter non-symmetrically, i.e. in just the upper branch to node 351. Note that the common-mode signal reduction circuit 330 ensures a differential input signal, however, so that the antenna signal will be present at both receiver input terminals. It is therefore provided a common-mode signal reduction circuit 330, providing a low impedance for common-mode signals. The common-mode signal reduction circuit 330 comprises an inverting amplifier 338, a first impedance 331, a second impedance 332, a third impedance 333 and a fourth impedance 334. The input of the inverting amplifier 338 is provided by a voltage division between the first and the second impedance 331, 332 where the first and second impedances 331, 332 have equal impedances, i.e. the voltage is evenly split. This voltage divided signal will thus correspond to the common-mode signal provided through the paths. The output of the amplifier 338 is provided to junction of the third and fourth impedances 333, 334 where the third and fourth impedances 333, 334 have equal impedances, which provides symmetry. The first and second impedances 331, 332, and the third and fourth impedances 333, 334, respectively, are connected in series between the filter 311 of the first type and the filter 313 of the second type, which is also the input terminals of the receiver 302. The inverting amplifier 338 will thus provide an output in response to the common-mode voltage detected by impedances 331 and 332, which is fed back through the third and fourth impedances 333, 334, i.e. a negative feedback loop. As now will be recognised, the feedback structure will suppress the common-mode signal if the amplifier 338 provides a sufficient gain. The gain is typically selected to be somewhere between 10 and 100 to keep noise generated by the common-mode signal reduction circuit 330 to a moderate level and have gain enough to provide a low enough common-mode impedance for most situations, where a gain of about 20 is a good starting point for fine-tuning the circuit. It is to be noted that noise generated by the amplifier 338 will not be substantially suppressed at the input stage of the differential receiver 302, wherein it is advisable that the amplifier 338 should have good noise performance.

The first and second impedances 331, 332 can be capacitors, which is a benefit in sense of noise, and since the common-mode signal normally is a high-frequency signal, the use of capacitors for the voltage division will work properly. The third and fourth impedances 333, 334 can also be capacitors, which would imply the same benefits. However, as the circuit is based on symmetry, i.e. the filters of the same type need to be terminated equally, a fifth impedance 335 and a sixth impedance 336 can be arranged between the transmitter and the filter of the first type 310 and the filter of the second type 312, respectively. The purpose of these impedances 335, 336 is to compensate for the non-zero common-mode impedance of the common-mode signal reduction circuit 330, which is due to the finite gain of the amplifier 338. By making the impedance of the impedances 335, 336 equal to the common-mode impedance, symmetry is restored. The assignment of the impedances 335, 336 can be made by design or be adapted by e.g. the controller 340. Thus, if only capacitors are used for the third and fourth impedances 333, 334, capacitors need to be used for the fifth and sixth impedances 335, 336 too. This may however make impedance matching cumbersome, in particular if the voltage gain of the amplifier 335 is high wherein the value of the compensation capacitors 335, 336 would be too large to enable a practically feasible circuit. It is therefore a benefit to include at least a resistive part for the third to sixth impedances 333-336.

Figure 4:
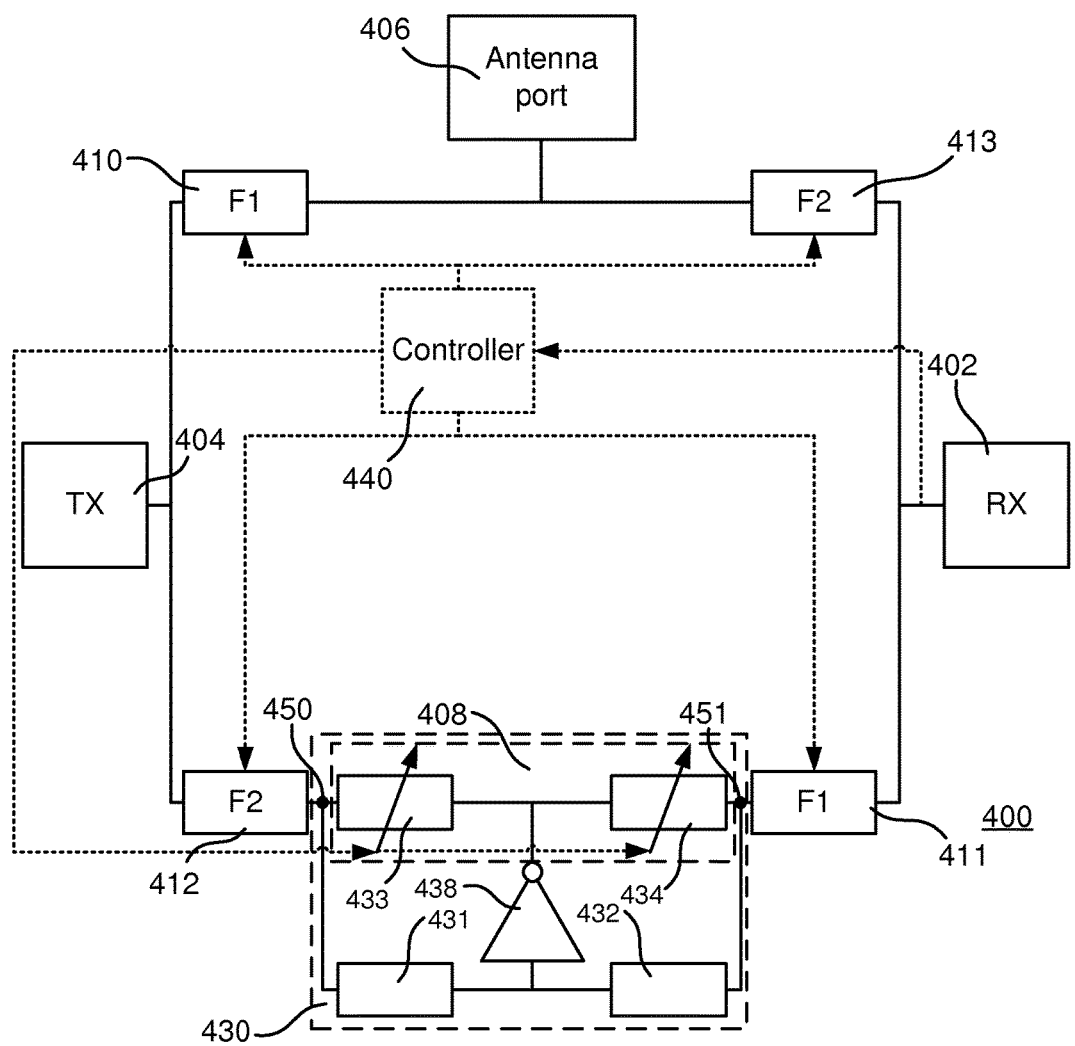
FIG. 4 is a block diagram which schematically illustrates a transceiver according to an embodiment.

While the embodiment demonstrated with reference to FIG. 3 is suitable for a receiver with differential input, the embodiment demonstrated with reference to FIG. 4 below is suitable for a receiver 402 with single-ended input. A further benefit of the embodiment demonstrated with reference to FIG. 4 is that the filter 411 between the balancing impedance circuit 408 and the receiver also suppresses any noise generated by the amplifier 438 of the common-mode signal reduction circuit 430. The common-mode signal reduction circuit 430 here performs the function of signal inversion. Still a benefit is that the third and fourth impedances 433, 434 of the common-mode signal reduction circuit 430 also form the balancing impedance circuit 408.

Similar as the embodiment demonstrated with reference to FIG. 3, the transceiver 400 comprises a receiver 402 arranged for frequency-division duplex communication with a wireless or wired communication network, a transmitter 404 arranged for frequency-division duplex, FDD, communication with the wireless or wired communication network, an antenna port 406 for connecting to an antenna, and a balancing impedance circuit 408 arranged to provide an adaptive impedance arranged to mimic the impedance at the antenna port 406, similar as demonstrated above.

The transceiver also comprises filters 410, 411, 412, 413 that are symmetrically arranged and symmetrically valued with respect to the two paths. The filter arrangement works similar as demonstrated for the embodiment of FIG. 3.

A controller 440 is provided for controlling adaptive impedances 433, 434 of the balancing impedance circuit 408. Here, although the controller 440 is depicted as a separate element, it can be integrated with the balancing impedance circuit 408 or the common-mode signal reduction circuit 430.

The controller 440 can comprise circuitry measuring transmitter contribution signal at the input of the receiver 402, as indicated by hashed line, and provide control to the balancing impedance circuit 408. The controller 440 can also be arranged to control the filters 410, 411, 412, 413 such that suitable filter characteristics for passing and attenuating signals as described above are achieved for different constellations of frequencies for transmitting and receiving. The operation of the controller 440 is thus similar as demonstrated with reference to FIG. 3.

The filters 412, 413 provides for attenuating transmit frequency signals from the transmitter before reaching the input of the receiver 402. The filters 410, 411 provides for attenuating receive frequency signals from the transmitter before reaching the input of the receiver. By inverting the sign, i.e. polarity, of the signal in the lower path, using the common-mode signal reduction circuit 430 in another way, the signals of the two paths will, if they have equal magnitude and opposite polarity, cancel when added at the receiver input. The common-mode signal reduction circuit 430 comprises an inverting amplifier 438, a first impedance 431, a second impedance 432, a third impedance 433 and a fourth impedance 434, wherein the third and fourth impedances 433, 434 also form the adaptive part of the balancing impedance circuit 408. The input of the inverting amplifier 438 is provided by a voltage division between the first and the second impedance 431, 432 where the first and second impedances 431, 432 have equal impedances, i.e. the voltage is evenly split such that the common-mode signal is detected. The output of the amplifier 438 is provided to a junction of the third and fourth impedances 433, 434 where the third and fourth impedances 433, 434 have equal impedances, which also here provides symmetry. The first and second impedances 431, 432, and the third and fourth impedances 433, 434, respectively, are connected in series between the filter 411 of the first type and the filter 412 of the second type. The inverting amplifier 438 will thus provide an output which is fed back through the third and fourth impedances 433, 434, i.e. a negative feedback loop. As discussed above, the feedback structure will cancel the common-mode signal if the amplifier 438 provides a sufficient gain. The gain can be selected as demonstrated above. By suppressing the common-mode voltage, only differential voltage will remain, which means that the voltage at the node 450 will be perfectly out of phase and have the same amplitude as the voltage of node 451, i.e. the desired signal inversion will take place. To ensure cancellation of the transmitter signals at the receiver input, the filters in the two paths must be terminated the same way. At the transmitter side, the filters are driven by the same voltage, and at the receiver side, when the circuit is properly tuned, there will be no voltage, both corresponding to zero impedance. This means that if the impedance in the interface between the filters is the same in both branches, the cancellation will be as desired. Circuit analysis reveals that for infinite gain in amplifier 438, the impedance of 433 and 434 should be equal to twice that of the impedance at the antenna port 406. The filter 412 will then be loaded by the input impedance of filter 411 in parallel with the antenna port impedance, like filter 413, and filter 411 will be loaded by the output impedance of filter 412 in parallel with the antenna port impedance, like filter 410. It is to be noted that noise generated by the amplifier 438 will now be suppressed by the filter structure before reaching the input of the receiver 402, as is readily understood from FIG. 4, wherein it is not that critical in this embodiment that the amplifier 438 should have good noise performance.

The first and second impedances 431, 432 can be capacitors, which provide a benefit in sense of noise and since the common-mode signal normally is a high-frequency signal the use of capacitors for the voltage division will work properly. The third and fourth impedances 433, 434 are adaptive since they need to mimic the impedance at the antenna port 406, and are assigned impedances accordingly. They have mutually equal impedance for symmetry reasons, and should each have close to twice the impedance of the antenna port, as discussed above.

Figure 5:
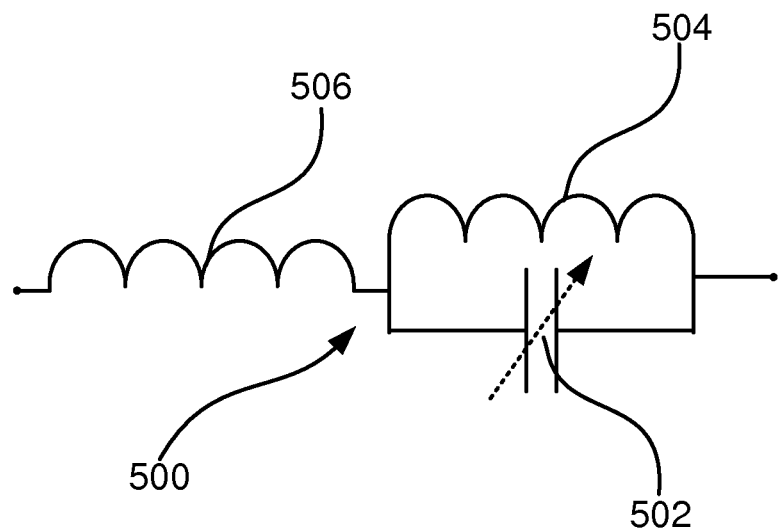
FIG. 5 illustrates a filter according to an embodiment.

The filters in the different embodiments demonstrated above can be made more or less complex, and with different constraints on performance. Simple filters comprising single capacitors or inductors may be used, but may not fulfil the demands of constraints set up. High-order filters may on the other hand introduce other problems, and/or cost/space issues. FIG. 5 illustrates a filter 500 according to an embodiment, which provides dual resonance properties where high insertion loss is provided at one frequency and low insertion loss is provided at another frequency not far from the first frequency, which has been found a reasonable compromise for at least some of the embodiments. It comprises an inductance 504 coupled in parallel with a capacitance 502, wherein the parallel coupling 502, 504 is coupled in series with an inductance 506 between the input and output of the filter 500. It provides a parallel resonance, attenuating the signal at a frequency below a series resonance where the signal is passed.

Figure 6:
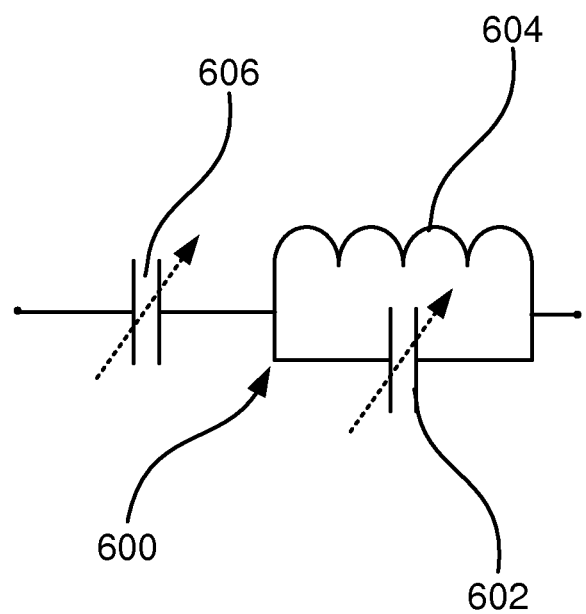
FIG. 6 illustrates a filter according to an embodiment.

FIG. 6 illustrates a filter 600 according to an embodiment, which corresponds to the filter demonstrated with reference to FIG. 5, but with the difference that the parallel coupling 602, 604 is coupled in series with a capacitance 606 between the input and output of the filter 600, and that it provides a series resonance frequency below the parallel resonance frequency.

Depending on whether receiving frequency is higher or lower than the transmitting frequency, the filters of the first type can be selected as one of the types illustrated in FIG. 5 or 6, and the filters of the second type are then selected as the other one of the types illustrated in FIG. 5 or 6.

For the controlling of filter properties as demonstrated above, an efficient way is to let the controller 340, 440 control the capacitance values of capacitances 502, 602, 606 of the filters, e.g. by having the capacitances 502, 602, 606 as controllable capacitance banks. It is of course also possible to control inductors 506, 504, 604.

Figure 7:
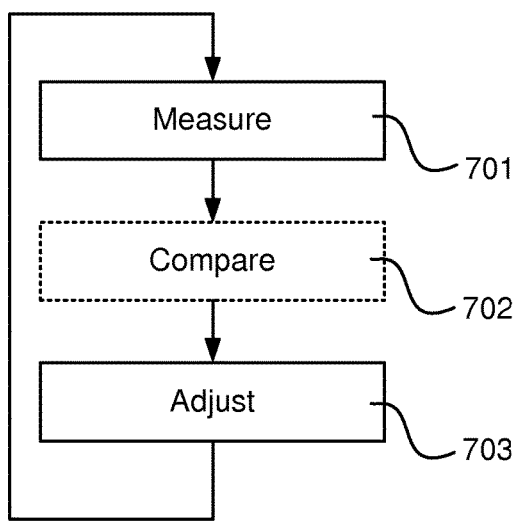
FIG. 7 is a flow chart which schematically illustrates a method according to embodiments.

FIG. 7 is a flow chart which schematically illustrates a method according to embodiments for controlling adaptable elements of the transceiver arrangements as described above. The controllable elements can be impedances, where impedance matching for proper operation as is discussed above, filters, where pass and stop frequencies are controlled for example for the current operation, and the amplifier, where gain is adapted to provide a proper balance between sufficient common-mode signal reduction, power consumption, and generation of noise. The method can comprise measuring 701 amplitude at terminal(s) of an input port of the receiver and adjusting 703 the adaptive impedance of the balancing impedance such that the amplitude is reduced. Here, it is assumed that when the amplitude is reduced, it is the transmitter signal component that is reduced by the adjustment, i.e. by providing symmetry as is discussed above. By measuring 701 the amplitude(s), the amplitude can be compared 702 with a previous measurement, and the adjusting 703 can be done accordingly to try to track towards a minimum during operation of the transceiver arrangement. The method can also comprise controlling pass and stop frequencies of the filters of the first and second types, respectively, based on receive and transmit frequencies of current operation of the transceiver arrangement. Still further, the method can comprise, for the arrangement demonstrated with reference to FIG. 3, adjusting the fifth and sixth impedances 335, 336 to balance the non-zero common-mode impedance of the common-mode signal reduction circuit 330. Here, it should be noted that the method can comprise any one of the above demonstrated adjustment approaches, or any combination of them.

Figure 8:
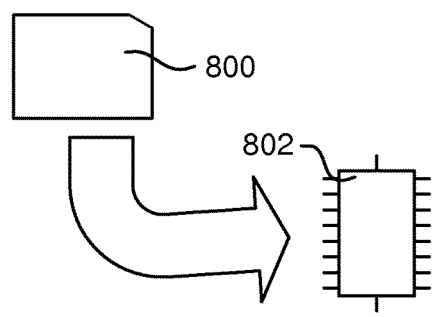
FIG. 8 schematically illustrates a computer program and a processor.

FIG. 8 schematically illustrates a computer program and a processor. The method according to the present invention is suitable for implementation with aid of processing means, such as computers and/or processors, especially for the case where the controller 340, 440 is implemented as processor or programmable circuit. Therefore, there is provided computer programs, comprising instructions arranged to cause the processing means, processor, or computer to perform the steps of any of the methods according to any of the embodiments described with reference to FIG. 7. The computer programs preferably comprises program code which is stored on a computer readable medium 800, as illustrated in FIG. 8, which can be loaded and executed by a processing means, processor, or computer 802 to cause it to perform the methods, respectively, according to embodiments of the present invention, preferably as any of the embodiments described with reference to FIG. 7. The computer 802 and computer program product 800 can be arranged to execute the program code sequentially where actions of the any of the methods are performed stepwise. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not to be construed as any direct illustration of the elements.

Figure 9:
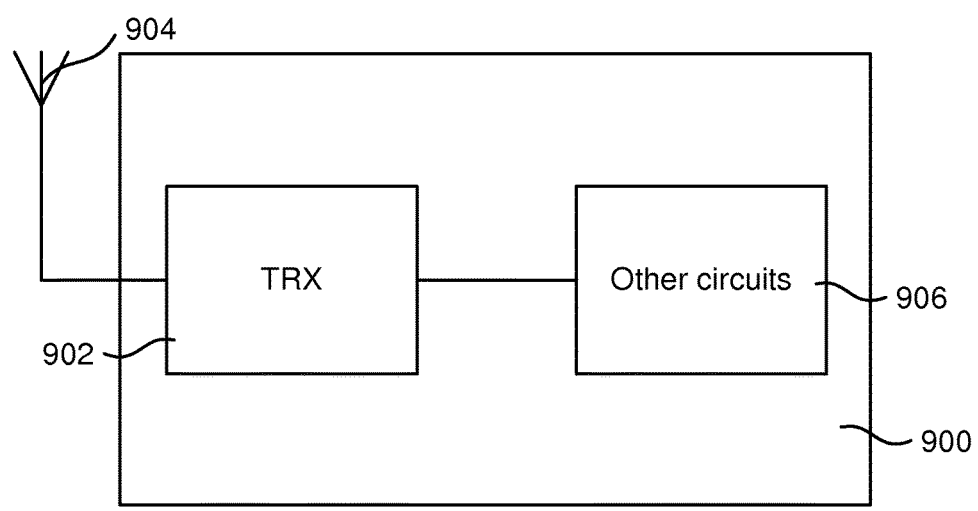
FIG. 9 is a block diagram schematically illustrating a communication device.

FIG. 9 is a block diagram schematically illustrating a communication device 900. The communication device 900 is capable of frequency division duplex communication via a communication network. The communication device 900 comprises a transceiver arrangement 902 according to any of the above demonstrated embodiments. The transceiver arrangement 902 is connected to an antenna 904 through its antenna port. The communication device can also comprise other circuits 906, such as interface towards a user and/or other circuitry or machines, memory, processor, etc. The communication device 900 can be a smartphone or cellphone, a communication card or device in or for a computer, an embedded communication device in a machine, or the like. The communication device 900 can be adapted for cellular communication, point-to-point communication, or for communication in a wireless or wired network.

The antenna port described above need not necessarily by connected to an antenna, but can equally be connected to a wired line which conveys radio frequency signals. Thus, the communication device 900 described with reference to FIG. 9 need not comprise the antenna 904 wherein the communication device is instead connected to such a wired line conveying radio frequency signals.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A transceiver arrangement comprising:
a receiver arranged for frequency-division duplex communication with a communication network;
a transmitter arranged for frequency-division duplex communication with the communication network;
a transmission port for connecting to an antenna;
a balancing impedance circuit arranged to provide an adaptive impedance arranged to mimic the impedance at the transmission port;
a filtering arrangement, which comprises filters of a first type and filters of a second type, connecting the receiver, transmitter, transmission port and balancing impedance circuit; and
a common-mode signal reduction circuit, wherein
the filters of the first type are arranged to pass signals at transmitter frequency and attenuate signals at receiver frequency and are connected between the transmitter and the transmission port and between the receiver and the balancing impedance circuit;
the filters of the second type are arranged to attenuate signals at transmitter frequency and pass signals at receiver frequency and are connected between the transmitter and the balancing impedance circuit and between the receiver and the transmission port; and
the common-mode signal reduction circuit comprises an inverting amplifier, the input of the inverting amplifier is provided by a voltage division between a first and a second impedance where the first and second impedance have equal impedances, and the output of the amplifier is provided to junction of a third and a fourth impedance where the third and fourth impedances have equal impedances and the first and second impedances, and the third and fourth impedances, respectively, are connected in series between a filter of the first type and a filter of the second type.

2. The transceiver arrangement according to claim 1, wherein the receiver has a differential input and the common-mode signal reduction circuit is arranged such that the first and second impedances, and the third and fourth impedances, respectively, are connected in series between the inputs of the differential input of the receiver.

3. The transceiver arrangement according to claim 2, comprising a fifth and a sixth impedance arranged between the transmitter and a filter of the first type and a filter of the second type, respectively, and the fifth and sixth impedances have equal impedances as the impedances terminating common-mode signals at the receiver input.

4. The transceiver arrangement according to claim 1, wherein the common-mode signal reduction circuit is arranged such that the third and fourth impedances form the balancing impedance circuit.

5. The transceiver arrangement according to claim 1, wherein the first and second impedances are capacitors.

6. The transceiver arrangement according to claim 1, wherein the filters of the first and second types are non-directional filters comprising linear components.

7. The transceiver arrangement according to claim 1, wherein the inverting amplifier has a voltage gain above 5.

8. The transceiver arrangement according to claim 1, further comprising an amplitude detector arrangement at a terminal or terminals of an input port of the receiver, wherein the transceiver arrangement comprises a controller arranged to control the adaptive impedance of the balancing impedance circuit such that the amplitude at the terminal or terminals of an input port of the receiver is reduced based on measurements by the amplitude detector arrangement.

9. The transceiver arrangement of claim 1, wherein the filters of the first type each comprises a capacitance and a first inductance coupled in parallel where the parallel coupling is coupled in series with a second inductance, and the filters of the second type each comprises a first capacitance and an inductance coupled in parallel, where the parallel coupling is coupled in series with a second capacitance.

10. The transceiver arrangement of claim 9, wherein at least one of the capacitance and the first and second inductances of each of the filters of the first type are controllable and are controlled by a controller, and at least one of the inductance and the first and second capacitances of each of the filters of the second type are controllable and are controlled by the controller.

11. The transceiver arrangement of claim 1, wherein the filters of the first type each comprises a first capacitance and an inductance coupled in parallel, where the parallel coupling is coupled in series with a second capacitance, and the filters of the second type each comprises a capacitance and a first inductance coupled in parallel where the parallel coupling is coupled in series with a second inductance.

12. The transceiver arrangement of claim 11, wherein at least one of the inductance and the first and second capacitances of each of the filters of the first type are controllable and are controlled by a controller, and at least one of the capacitance and the first and second inductances of each of the filters of the second type are controllable and are controlled by the controller.

13. A communication device, capable of frequency division duplex communication via a communication network, comprising a transceiver arrangement according to claim 1.

14. A method of controlling a transceiver arrangement, the method comprising:
measuring amplitude at terminals of an input port or output port of the receiver; and
adjusting an adaptive impedance of a balancing impedance such that the amplitude is reduced,
wherein the transceiver arrangement comprises:
a receiver arranged for frequency-division duplex communication with a communication network;
a transmitter arranged for frequency-division duplex communication with the communication network;
a transmission port for connecting to an antenna;
the balancing impedance circuit arranged to provide the adaptive impedance arranged to mimic an impedance at the transmission port;
a filtering arrangement, which comprises filters of a first type and filters of a second type, connecting the receiver, transmitter, transmission port and balancing impedance circuit; and
a common-mode signal reduction circuit, wherein
the filters of the first type are arranged to pass signals at transmitter frequency and attenuate signals at receiver frequency and are connected between the transmitter and the transmission port and between the receiver and the balancing impedance circuit;

the filters of the second type are arranged to attenuate signals at transmitter frequency and pass signals at receiver frequency and are connected between the transmitter and the balancing impedance circuit and between the receiver and the transmission port; and the common-mode signal reduction circuit comprises an inverting amplifier, the input of the inverting amplifier is provided by a voltage division between a first and a second impedance where the first and second impedance have equal impedances, and the output of the amplifier is provided to junction of a third and a fourth impedance where the third and fourth impedances have equal impedances and the first and second impedances, and the third and fourth impedances, respectively, are connected in series between a filter of the first type and a filter of the second type.

15. The method of claim 14, further comprising controlling pass and stop frequencies of the filters of the first and second types, respectively, based on receive and transmit frequencies of current operation of the transceiver arrangement.

\* \* \* \* \*